United States Patent
Hiramoto (10) Patent No.: US 11,536,822 B2
(45) Date of Patent: Dec. 27, 2022

(54) RADAR DEVICE

(71) Applicant: TOYOTA JIDOSHA KABUSHIKI KAISHA, Toyota (JP)

(72) Inventor: Kazuki Hiramoto, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 229 days.

(21) Appl. No.: 16/897,800

(22) Filed: Jun. 10, 2020

(65) Prior Publication Data
US 2021/0055399 A1 Feb. 25, 2021

(30) Foreign Application Priority Data

Aug. 21, 2019 (JP) .............................. JP2019-151393

(51) Int. Cl.
*G01S 13/06* (2006.01)
*G01S 7/41* (2006.01)
*G01S 13/58* (2006.01)

(52) U.S. Cl.
CPC .............. *G01S 13/06* (2013.01); *G01S 7/415* (2013.01); *G01S 13/589* (2013.01)

(58) Field of Classification Search
CPC ........ G01S 13/06; G01S 7/415; G01S 13/589; G01S 13/87; G01S 13/931; G01S 13/62
USPC .......................................................... 342/59
See application file for complete search history.

(56) References Cited

U.S. PATENT DOCUMENTS

| 9,097,801 B2 * | 8/2015 | Kambe ................. G01S 13/931 |
| 10,343,696 B2 | 7/2019 | Nishida et al. |
| 10,399,522 B2 | 9/2019 | Kaminade et al. |
| 10,427,689 B2 | 10/2019 | Tokimasa et al. |
| 10,486,698 B2 | 11/2019 | Masui et al. |
| 10,583,737 B2 | 3/2020 | Chiba et al. |
| 10,793,147 B2 | 10/2020 | Kaminade et al. |
| 10,922,561 B2 | 2/2021 | Ozawa et al. |
| 11,072,328 B2 | 7/2021 | Masui et al. |
| 11,131,769 B2 | 9/2021 | Mizuno et al. |
| 2015/0353078 A1 | 12/2015 | Kaminade |
| 2017/0212231 A1* | 7/2017 | Iwai ...................... G01S 7/2921 |
| 2018/0128913 A1* | 5/2018 | Bialer .................... G01S 13/89 |

FOREIGN PATENT DOCUMENTS

| JP | 2006-221498 A | 8/2006 | |
| JP | 2008039719 A * | 2/2008 | ............ G01S 13/34 |
| JP | 2009-41981 A | 2/2009 | |
| JP | 2009-133761 A | 6/2009 | |
| JP | 2009133761 A * | 6/2009 | |
| JP | 2009-217495 A | 9/2009 | |
| JP | 2010249613 A * | 11/2010 | |
| JP | 2014055883 A * | 3/2014 | |
| JP | 2015-230566 A | 12/2015 | |

* cited by examiner

*Primary Examiner* — Vladimir Magloire
*Assistant Examiner* — Alexander L. Syrkin
(74) *Attorney, Agent, or Firm* — Sughrue Mion, PLLC

(57) ABSTRACT

A radar device includes a first radar and a second radar that are arranged at positions separated from each other, and of which detection ranges are at least partially overlapped; and a detection unit that detects at least one of a moving direction and a velocity vector of a reflection point existing in an overlapped portion of the detection ranges, based on a first detection result of the first radar and a second detection result of the second radar.

9 Claims, 4 Drawing Sheets

RADAR DEVICE

CROSS-REFERENCE TO RELATED APPLICATION

This application claims priority to Japanese Patent Application No. 2019-151393 filed on Aug. 21, 2019, incorporated herein by reference in its entirety.

BACKGROUND

1. Technical Field

The present disclosure relates to a radar device.

2. Description of Related Art

As such a type of device, proposed is, for example, a device which detects a target and a velocity of the target using a single radar, and identifies a ghost generated by reflection of radio waves (that is, a phenomenon in which, when a reflected wave from the existing target is further reflected by, for example, a wall or guardrail and then received by a receiving antenna, a reflection point group is seen as being behind the wall or guardrail) (refer to JP-A-2009-133761).

SUMMARY

In a case where a velocity of the target is detected by a single radar, it is very common that the detected velocity is based on a change in frequency due to the Doppler effect. When the velocity is detected as stated above (that is, when the velocity is detected by a Doppler radar), the velocity of the target moving in a traveling direction of a detection wave emitted from the radar (hereinafter sometimes referred to as a "line-of-sight direction") can be detected; however, the velocity of the target moving in a direction perpendicular to the line-of-sight direction cannot be detected. The moving direction and the velocity vector of the target cannot be obtained unless the velocity in the line-of-sight direction and the velocity in the direction which is different from the line-of-sight direction are combined. Accordingly, in the related art wherein only a single radar is used, the moving direction and the velocity vector of the target cannot be obtained.

The present disclosure is intended to provide a radar device which can obtain at least one of the moving direction and the velocity vector of the target by detecting moving velocity in the direction perpendicular to the line-of-sight direction from among velocity components of the target, in order to address the shortcomings stated above.

A radar device according to one aspect of the present disclosure includes a first radar and a second radar that are arranged at positions separated from each other, and of which detection ranges are at least partially overlapped, and a detection unit configured to detect at least one of a moving direction and a velocity vector of a reflection point existing in an overlapped portion of the detection ranges, based on a first detection result of the first radar and a second detection result of the second radar.

With the radar device according to the present disclosure, at least one of the moving direction and the velocity vector of the target can be obtained.

BRIEF DESCRIPTION OF THE DRAWINGS

Features, advantages, and technical and industrial significance of exemplary embodiments will be described below with reference to the accompanying drawings, in which like signs denote like elements, and wherein.

DETAILED DESCRIPTION OF EMBODIMENTS

Embodiments of the radar device will be described referring to drawings.

First Embodiment

A first embodiment of the radar device will be described with reference to FIGS. 1 to 4.

The radar device according to the first embodiment includes: a first radar and a second radar that are arranged at positions separated from each other, and of which detection ranges are at least partially overlapped; and a detection unit configured to detect at least one of a moving direction and a velocity vector of a reflection point existing in an overlapped portion of the detection ranges, based on a first detection result of the first radar and a second detection result of the second radar.

Various conventional radars can be used as the first radar and the second radar, thus a detailed description will be omitted. A distance between the first radar and the second radar is not particularly limited as long as their detection ranges are at least partially overlapped. A line-of-sight direction of the first radar and a line-of-sight direction of the second radar may be not parallel to each other (for example, they may intersect or be skew). The first detection result, which is a detection result by the first radar, may be represented as, for example, a value on polar coordinates of which the origin is a location of the first radar. Similarly, the second detection result, which is a detection result by the second radar, may be represented as, for example, a value on polar coordinates of which the origin is a location of the second radar.

The radar device may include three or more radars. In this case, for example, the detection range of the first radar and the detection range of the second radar are overlapped, and the detection range of the second radar and a detection range of a third radar are overlapped; however, the detection range of the first radar and the detection range of the third radar may not be overlapped. Alternatively, for example, the detection range of the first radar, the detection range of the second radar, and the detection range of the third radar may be overlapped.

The first detection result includes a detection result that a reflection point existing in the overlapped portion is detected by the first radar, and the second detection result includes a detection result that the reflection point is detected by the second radar. That is, the reflection point existing in the overlapped portion is detected by both the first radar and the second radar, which are arranged so as to be apart from each other. In other words, the reflection point is observed from different angles.

In a case of a single radar, it is common that the velocity of the reflection point is detected based on, for example, a change in frequency due to the Doppler effect. However, a single radar cannot detect the velocity of the reflection point moving in the direction perpendicular to the line-of-sight direction.

In the radar device of the present disclosure, the reflection point existing in the overlapped portion is detected by both the first radar and the second radar. Even if the reflection point moves in the direction perpendicular to the line-of-sight direction of one of the first radar or the second radar, the reflection point moves in a direction other than the direction perpendicular to the line-of-sight direction of the other radar. Accordingly, it is possible to obtain information on the velocity of the reflection point from the detection result of the other radar. Therefore, the detection unit can detect at least one of the moving direction and the velocity vector (that is, the velocity) of the reflection point based on the first detection result and the second detection result.

The velocity of the reflection point detected by the single radar is represented by $V_0 \cos \theta$, where $V_0$ is the velocity vector of the reflection point and $\theta$ is an angle between the line-of-sight direction of the radar and the velocity vector. On the other hand, the radar device according to the present disclosure can detect the velocity vector "$V_0$".

Figure 1:
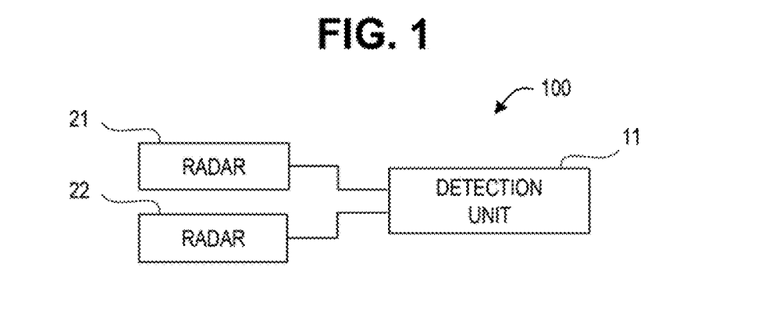
FIG. 1 is a block diagram illustrating a configuration of a radar device according to a first embodiment.

As shown in FIG. 1, a radar device 100 as a specific example of the radar device according to the present disclosure includes a radar 21 corresponding to the first radar, a radar 22 corresponding to the second radar, and a detection unit 11 corresponding to the detection unit.

Figure 2:
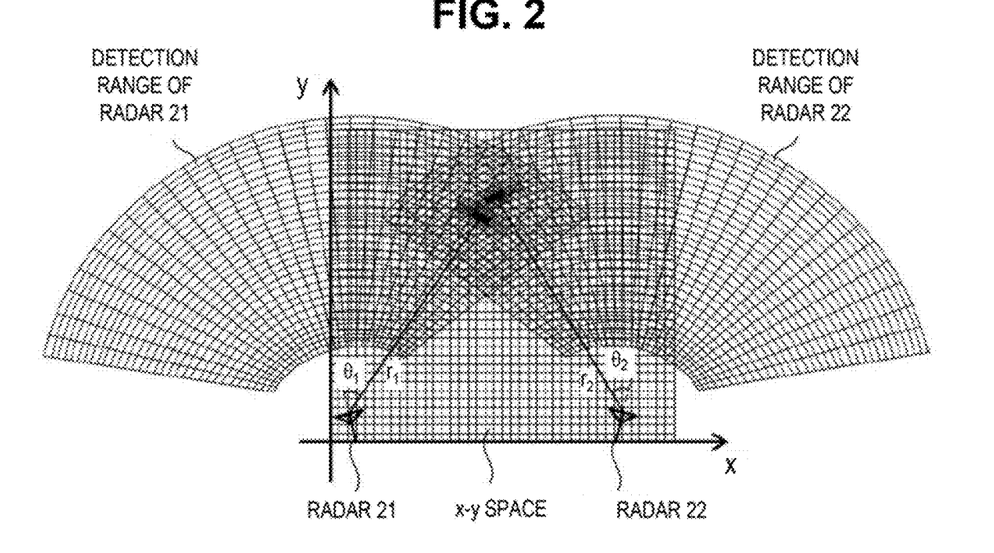
FIG. 2 is a diagram illustrating an example of a detection range of each radar.

The reflection point existing in a portion where a detection range of the radar 21 and a detection range of the radar 22 are overlapped is detected by both the radar 21 and the radar 22. As an example of the detection result of the radar 21, assuming that a reflection intensity $\sigma_1$ is obtained for the reflection point at a distance $r_1$ and at an azimuth angle $\theta_1$, the detection result of the radar 21 may be represented as a contour diagram as shown in FIG. 2. Similarly, as an example of the detection result of the radar 22, assuming that a reflection intensity $\sigma_2$ is obtained for the reflection point at a distance $r_2$ and at an azimuth angle $\theta_2$, the detection result of the radar 22 may be represented as a contour diagram as shown in FIG. 2.

The detection unit 11 projects the detection result of the radar 21 and of the radar 22 on, for example, an x-y space. At this time, the detection unit 11 may overlap-add, for example, the detection result of the radar 21 and of the radar 22, using weights, which is calculated based on an area fraction of a single pixel when converting one pixel on the polar coordinates specified by the distance and the azimuth angle into a pixel on the x-y space, and a reflection intensity of the single pixel.

Alternatively, as another example of the detection result of the radar 21, an estimation parameter set $(r, \theta, \sigma)$ using the distance, the azimuth angle, and the reflection intensity as parameters for the reflection point may be obtained. Similarly, as another example of the detection result of the radar 22, an estimation parameter set $(r, \theta, \sigma)$ using the distance, the azimuth angle, and the reflection intensity as parameters for the reflection point may be obtained. In this case, the detection unit 11 may distribute the reflection point, for example represented by $(r, \theta)$ corresponding to a Gaussian distribution, weight in accordance with the reflection intensity, and overlap-add the detection result of the radar 21 and of the radar 22 to the pixel in the x-y space.

There may be a case in which the reflection point detected by the radar 21 does not collate with the reflection point detected by the radar 22 even though they are actually the same reflection point, due to, for example, the angle measurement accuracy of the radar 21 and the radar 22. When the detection unit 11 overlap-adds the detection result of 21 and the detection result of the radar 22, a plurality of reflection points may be regarded as a single reflection point in a case where a plurality of reflection points exist within a predetermined threshold radius.

The "threshold radius" may be determined according to, for example, a distance resolution and an angular resolution of the radar. The "threshold radius" may change according to, for example, a distance from the radar to the reflection point, and a type of the detection target. In a case where the detection target is, for example, a vehicle, the threshold radius may be set to a relatively large value. On the other hand, in a case where the detection target is, for example, a pole, the threshold radius may be set to a relatively small value.

Figure 3:
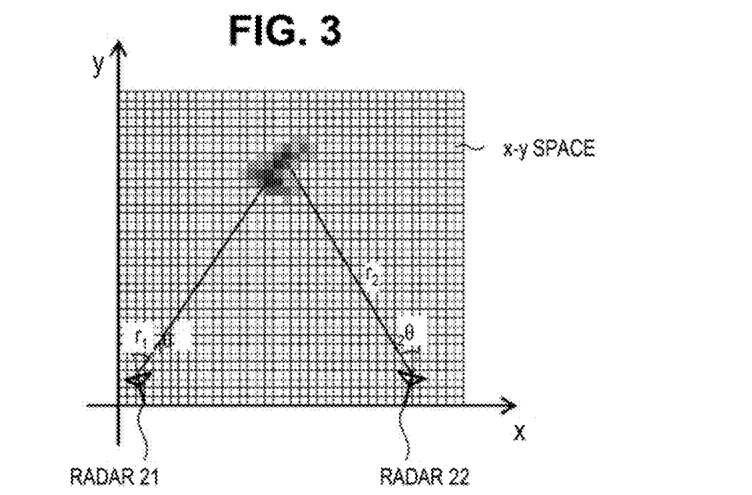
FIG. 3 is an example of a result obtained by integrating the detection results of respective radars in an x-y space.

As a result of such processing, the detection unit 11 may obtain, for example, a result in which the detection result of the radar 21 and the detection result of the radar 22 are projected on the x-y space, as shown in FIG. 3. The detection unit 11 may identify a target (that is, a reflection point group) based on the result projected on the x-y space. In this case, the detection unit 11 may estimate a center of the target and its outline based on the result projected on the x-y space.

Various conventional methods can be used to identify the target, thus a detailed description will be omitted. When determining whether or not the plurality of reflection points should be regarded as one target, the determination can be made for whether the plurality of reflection points are included in a range specified by, for example, a predetermined determination value. In other words, the plurality of reflection points may be regarded as one target.

The detection unit 11 may estimate the velocity vector of the reflection point corresponding to, for example, the center of the target. The velocity of the reflection point corresponding to the center of the target, estimated by the radar 21 or the radar 22, is set to $v_{21}$ or $v_{22}$, respectively. Further, $v_{21}$ and $v_{22}$ may be estimated based on the change in frequency due to the Doppler effect. The angles between the line-of-sight directions of the radar 21 and the radar 22 and the velocity vector of the reflection point are defined as $\theta_{21}$ and $\theta_{22}$, respectively. When the velocity vector related to the reflection point corresponding to the center of the target is V, the following equation is established.

$$V = \frac{v_{21}}{\cos\theta_{21}} = \frac{v_{22}}{\cos\theta_{22}} \qquad \text{[Formula 1]}$$

When a relative angle between the radar 21 and the radar 22 (for example, an angle between the line-of-sight direction of the radar 21 and the line-of-sight direction of the radar 22) is $\varphi$, "$\theta_{22}=\varphi-\theta_{21}$" is established. Therefore, if the relative angle $\varphi$ is known, the velocity vector V can be obtained from the equation stated above. In addition to, or instead of, obtaining the velocity vector, the detection unit 11 may estimate, for example, the moving direction of the reflection point corresponding to the center of the target from, for example, a temporal change in the result of projecting the detection result of the radar 21 and the detection result of the radar 22 on the x-y space.

The detection unit 11 may regard the velocity vector of the reflection point corresponding to the center of the target as the velocity vector of the target. Alternatively, the detection unit 11 may estimate the velocity vector of a single target based on the velocity vectors of respective reflection points included in a single target.

The operation of the radar device 100 will be described with reference to a flowchart of FIG. 4.

Figure 4:
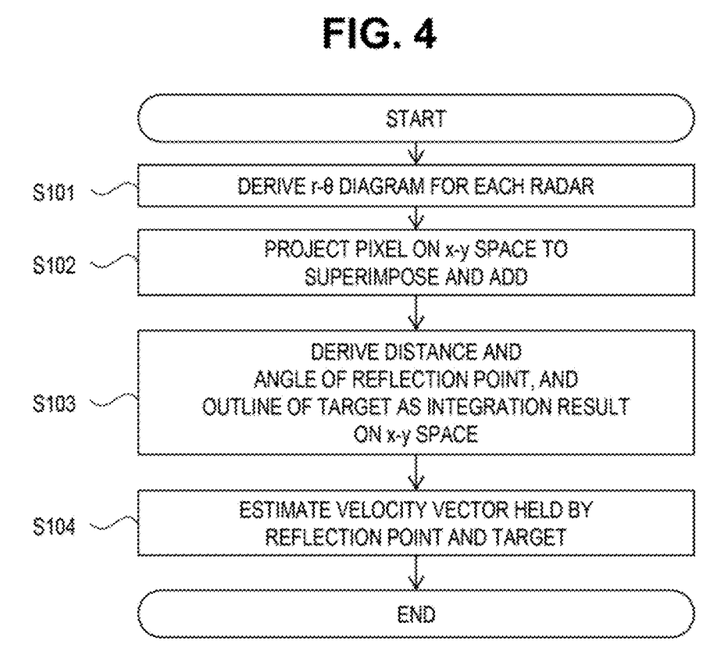
FIG. 4 is a flowchart illustrating an operation of the radar device according to the first embodiment.

In FIG. 4, the detection unit 11 may derive, for example, an r-θ diagram (corresponding to the contour diagram stated above) for each of the radar 21 and the radar 22 (step S101). The detection unit 11 projects the detection result of the radar 21 and the detection result of the radar 22 on, for example, the x-y space, and overlap-adds the detection result of the radar 21 and the detection result of the radar 22 at the pixel on the x-y space (step S102).

The detection unit 11 derives the distance and the angle (e.g. azimuth angle) of the reflection point for each of the radar 21 and the radar 22, on the x-y space, as the result of overlap-adding in the processing of step S102 (that is, the result of integrating the detection result of the radar 21 and the detection result of the radar 22); in other words, the detection unit 11 derives a position of the reflection point which is represented by the distance and the angle (step S103). The detection unit 11 may further perform the target identification (for example, deriving the outline of the target).

The detection unit 11 estimates the reflection point (for example, the reflection point corresponding to the center of the target) and the velocity vector of the target (step S104). In addition, or instead of, the velocity vector, the detection unit 11 may estimate the reflection point as well as the moving direction of the target.

Technical Effect

According to the radar device 100, the distance and the angle of the reflection point existing in the overlapped portion between the detection range of the radar 21 and of the radar 22 can be determined with high accuracy as compared with a case where the reflection point is observed by a single radar. The radar device 100 has very practically advantageous in terms of improving low angle measurement accuracy, which is disadvantage of radars. Consequently, use of the radar device 100 allows the estimation accuracy of the outline of the target to improve.

In a case of the single radar, it is common that the velocity of the reflection point is obtained based on, for example, a change in frequency due to the Doppler effect. Consequently, the single radar can detect the velocity of the reflection point moving the line-of-sight direction, but cannot detect the velocity of the reflection point moving in the direction perpendicular to the line-of-sight direction. On the other hand, the radar device 100 can also detect the velocity of the reflection point moving in the direction perpendicular to the line-of-sight direction using the integrated result of the detection result of the radar 21 and of the radar 22.

Second Embodiment

A second embodiment of the radar device will be described with reference to FIGS. 5 to 7. The second embodiment is the same as the first embodiment except that the configuration of the radar device is partially different. Therefore, the description of the second embodiment that is the same as that of the first embodiment will be omitted; the common parts in the drawings will be denoted by the same reference numbers, and the different points will be described referring to FIGS. 5 to 7.

The radar device according to the second embodiment is mounted on a vehicle such as an automobile, for example. In a case where the radar device is mounted on the vehicle, the line-of-sight direction of the radar may deviate from a designed value due to, for example, vibration during traveling of the vehicle. If the line-of-sight direction of the radar deviates from the designed value, the relative angle between the radars may change, thus the velocity vector of the reflection point cannot be accurately detected. Further, for example, a difference between the traveling direction of the vehicle and the line-of-sight direction of the radar, i.e. an aiming error, may be an issue. The radar device according to the second embodiment has a configuration capable of addressing such an issue related to the angle of the radar.

A radar device 200, as a specific example of the radar device according to the second embodiment, is mounted on a vehicle 1. As shown in FIG. 5, the radar device 200 includes a plurality of radars including the radar 21, the radar 22, and the ECU (electronic control unit) 10. The plurality of radars may be arranged on, for example, the front, side, and rear of the vehicle 1, respectively, as shown in FIG. 6. Further, a fan-shaped and hatched portion, shown in FIG. 6, represents the detection range of each radar.

The ECU 10 includes a detection unit 11, a correction unit 12, a collation unit 13, an identification unit 14, and a subject vehicle location detection unit 15 as processing blocks logically implemented or processing circuits physically implemented.

The reflection point indicated by the result which projected the detection result of the radar 21 and the detection result of the radar 22 on the x-y space (see FIG. 3) may be obtained by trigonometry based on, for example, the distance from the radar 21 to one reflection point, the distance from the radar 22 to the one reflection point, and the distance between the radar 21 and the radar 22.

In a case where, the actual relative angle between the radars deviates from the expected value (e.g. the designed value of the relative angle) due to, for example, the line-of-sight direction of at least one radar deviating from the designed value, the correction unit 12 corrects the relative angle for determining the velocity vector is obtained. Further, "the actual relative angle between the radars deviates from the expected value" is appropriately referred to as "the relative angle is deviated."

The radar device 200 may have, for example, information on the observation result of a corner reflector for adjusting the radar angle at the time of manufacturing or regular inspection of the vehicle 1, the observation result of a linearly continuous structure such as a wall at the time of the traveling of the vehicle 1, and other radar angles. The correction unit 12 determines whether the relative angle is deviated or not with reference to these pieces of information. When it is determined that the relative angle is deviated, the correction unit 12 corrects the relative angle for determining the velocity vector is obtained, by referring to these pieces of information or the position of the reflection point obtained by trigonometry as stated above. When the deviated angle of one radar is corrected, the correction unit 12 may refer to the detection result of the other radar of which the detection range is at least partially overlapped with the detection range of the one radar.

The collation unit 13 collates the stationary target with the map information 30 based on the result of the same processing as the processing shown in the flowchart of FIG. 4 (hereinafter referred to as "surrounding environment recognition result by radar"). The collation unit 13 may mainly collate the stationary target (for example, a wall, a guardrail, or a median strip) extending along the traveling direction of the vehicle 1 with the map information 30. At this time, the collation unit 13 may estimate the position and the curvature of the stationary target extending along the traveling direction of the vehicle 1, and collate with the map information 30.

A determination as to whether or not the target detected by the radar is a stationary target may be determined based on, for example, the velocity vector of the reflection point estimated by the detection unit 11. The radar device 200 may have an own map information 30, or the radar device 200 may share the map information 30 with another device like a car navigation device, and so on.

The identification unit 14 identifies a ghost based on the collation result by the collation unit 13. Specifically, the identification unit 14 may identify, based on the collation result, for example, when a pair of reflection point groups having symmetric velocity vectors exist at positions with a reflection point group identified as a wall therebetween, one of the pair of the reflection point groups as a ghost.

The subject vehicle location detection unit 15 detects the location of the vehicle 1 using well-known technology such as GPS (Global Positioning System). The location of the vehicle 1 detected by the subject vehicle location detection unit 15 is referred to when the collation unit 13 collates the stationary target with the map information 30.

The operation of the radar device 200 will be described with reference to a flowchart of FIG. 7.

Figure 7:
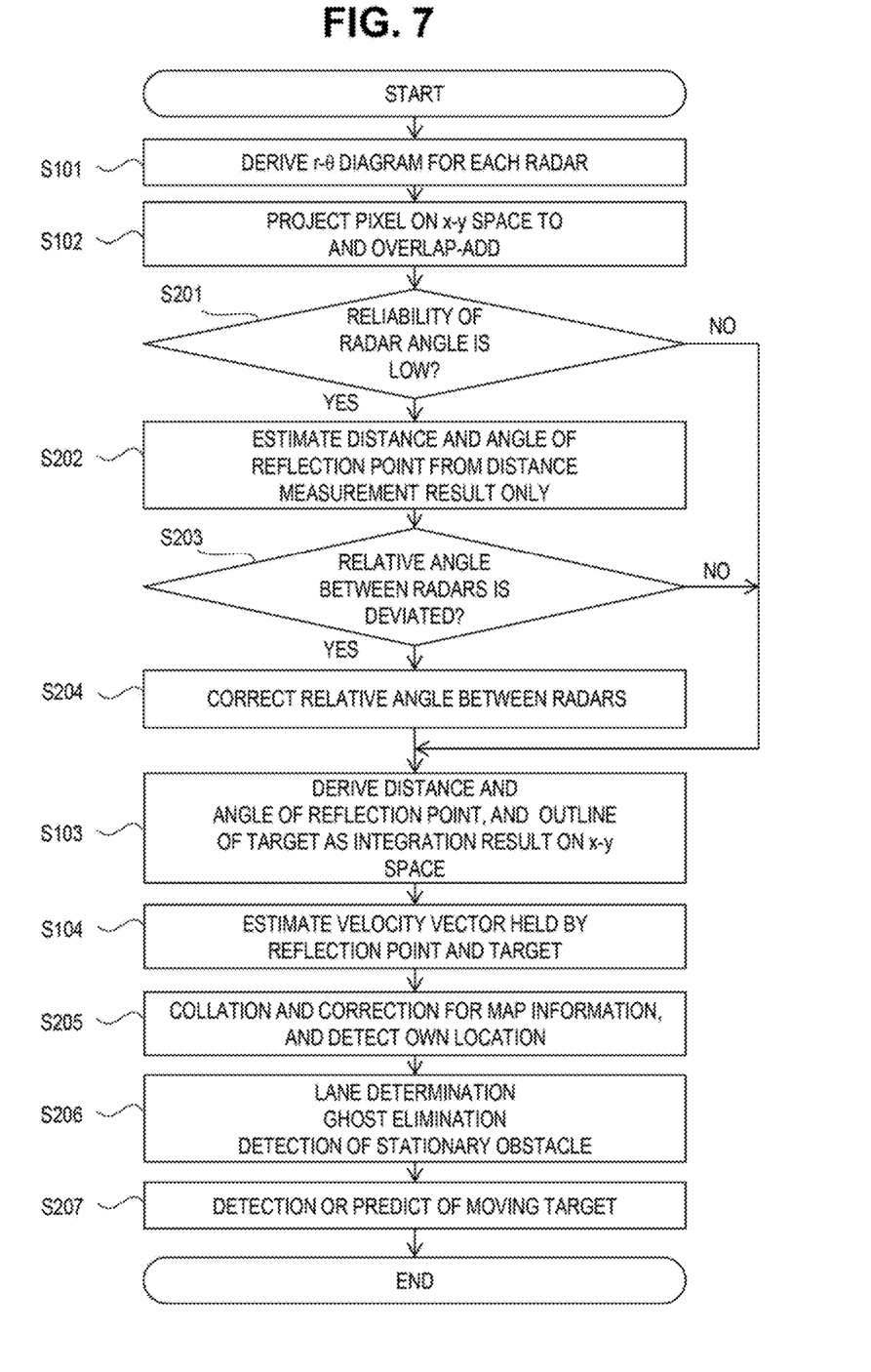
FIG. 7 is a flowchart illustrating an operation of the radar device according to the second embodiment.

After the processing in step S102 shown in FIG. 7, the detection unit 11 determines whether the reliability of the radar angle is low or not (step S201). The detection unit 11 may perform the processing of step S201 for each overlapped portion of the radar detection ranges. For example, the detection unit 11 may determine whether or not the reliability of the radar angle of each of the radar 21 and the radar 22 is low with respect to the overlapped portions of the detection range of the radar 21 and of the radar 22.

A determination of whether the reliability of the radar angle is low or not may be made based on the observation result of a corner reflector for adjusting the radar angle at the time of, for example, manufacturing or regular inspection of the vehicle 1, the observation result of a linearly continuous structure such as a wall at the time of the traveling of the vehicle 1, and other radar angles. For example, the detection unit 11 may determine that the reliability of the radar angle is low when the deviation of the reflection point indicated by the observation result of the corner reflector is larger than a predetermined threshold.

In the processing of step S201, when it is determined that the reliability of the radar angle is not low (step S201: No), the processing of step S103 is performed. On the other hand, when it is determined in the processing of step S201 that the reliability of the radar angle is low (step S201: Yes), the detection unit 11 estimates the distance and the angle of the reflection point (that is, the position of the reflection point represented by the distance and the angle) based only on the distance measurement result by the radar (step S202). At this time, the detection unit 11 may obtain the position of one reflection point by trigonometry, based on the distance from the radar 21 to the one reflection point, the distance from the radar 22 to the one reflection point, and the distance between the radar 21 and the radar 22, as stated above.

The correction unit 12 determines whether the relative angle between the radars is deviated or not with reference to these pieces of information (step S203). The correction unit 12 may perform the processing of step S203 for each overlapped portion of the radar detection ranges. For example, the correction unit 12 may determine whether or not the relative angle between the radar 21 and the radar 22 is deviated with respect to the overlapped portions of the detection range of the radar 21 and of the radar 22.

In the processing of step S203, when it is determined that the relative angle between the radars is not deviated (step S203: No), the processing of step S103 is performed. On the other hand, when it is determined that the relative angle between the radars is deviated (step S203: yes) in the processing of step S203, the correction unit 12 corrects the relative angle for determining the velocity vector is obtained (step S204).

In parallel with or before or after the processing of step S104, the collation unit 13 acquires a map indicating the surroundings of the vehicle 1 from the map information 30 based on the location of the vehicle 1 detected by the subject vehicle location detection unit 15. After the processing of step S104, the collation unit 13 collates the acquired map with the surrounding environment recognition result by the radar (step S205).

Figure 5:
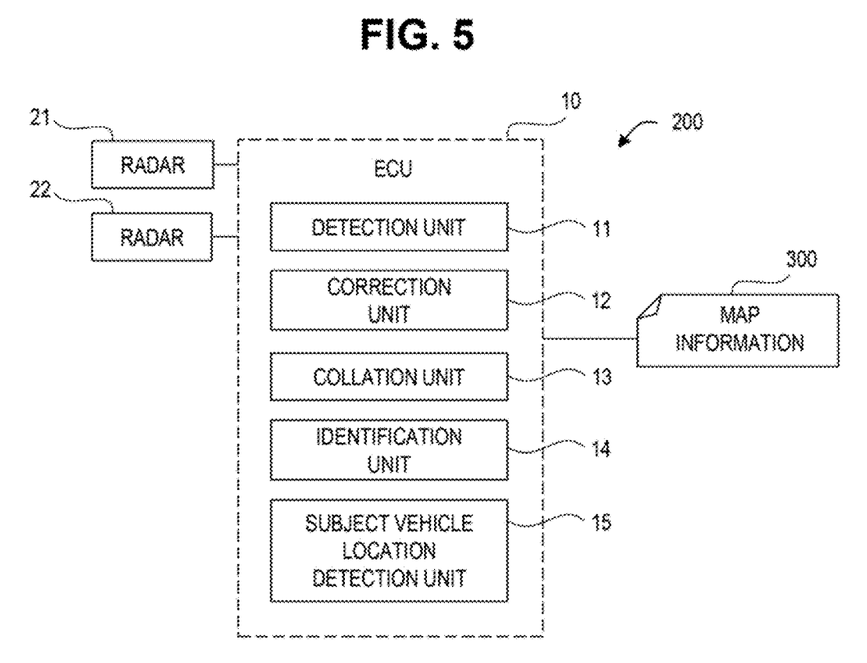
FIG. 5 is a block diagram illustrating a configuration of a radar device according to a second embodiment.
Figure 6:
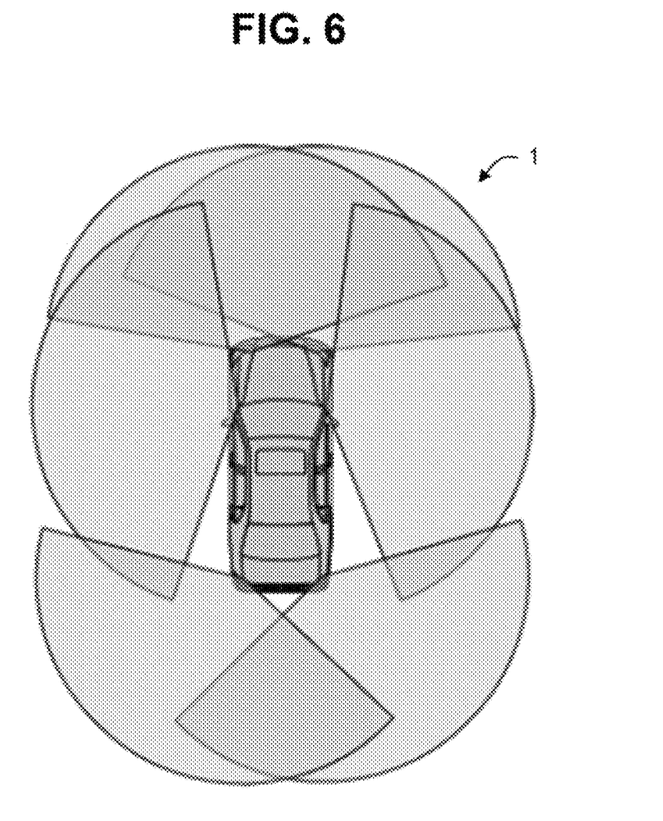
FIG. 6 is a diagram illustrating an example of a detection range of a radar related to the radar device according to the second embodiment.

As shown in FIG. 5, when the radar is mounted on the side of the vehicle 1, the radar device 200 performs the observation in the direction perpendicular to the traveling direction of the vehicle 1 (that is, the observation of the side of the vehicle 1) with relatively high accuracy by applying the synthetic aperture technology. The collation unit 13 may correct the location of the vehicle 1 detected by the subject vehicle location detection unit 15 by collating the structure based on the observation result obtained by synthetic aperture technology and the structure in the map illustrating the surroundings of the vehicle 1. The structure may be, for example, a road sign or a guide sign.

After the processing of step S205, the identification unit 14 identifies a ghost based on the collation result by the collation unit 13. The identification unit 14 removes the reflection point group (that is, the target) identified as the ghost from the surrounding environment recognition result by radar (step S206).

The identification unit 14 may identify the reflection point group of a moving target existing in a non-traveling area such as a building area, as a ghost with reference to the map for collating. Alternatively, the identification unit 14 may not identify the reflection point group of the moving target existing behind the guardrail when the vehicle 1 is near a merging point, as a ghost with reference to the map for collating. In this case, for example, it is possible to prevent a merging vehicle from being identified as a ghost.

In the portion where the radar detection ranges are overlapped, the reflection intensity of the reflection point group corresponding to the ghost is weaker than the reflection intensity of the reflection point group corresponding to the actual object; and the variation of the reflection intensity is large. The identification unit 14 may identify a ghost by referring to such a feature.

The identification unit 14 may determine the lane in which the vehicle 1 is traveling based on the collation result by the collation unit 13, and the lane (white line) location information included in the map indicating the surroundings of the vehicle 1.

The identification unit 14 may detect a stationary obstacle such as a vehicle involved in an accident, for example, based on the collation result by the collation unit 13. In a case where there is a stationary obstacle around the vehicle 1, it means that when the surrounding environment recognition result by radar is collated with the map indicating the surroundings of the vehicle 1, there is a difference between the shape of the structure, such as a guardrail, and the shape of such a structure indicated by the map. The identification unit 14 may detect a stationary obstacle based on such a difference.

After the processing of step S206, the identification unit 14 detects the moving target corresponding to, for example, another vehicle existing around the vehicle 1 based on the surrounding environment recognition result by radar from which the ghost has been removed (step S207). At this time, the identification unit 14 may determine the lane in which the moving target corresponding to another vehicle is traveling, based on, for example, the collation result by the collation unit 13. The identification unit 14 may further predict the movement of the moving target corresponding to another vehicle. When the stationary obstacle is detected, the identification unit 14 may predict the movement of the moving target based on, for example, a positional relationship between the moving target corresponding to another vehicle and the stationary obstacle, and a lane in which the moving target exists.

Technical Effect

In the radar device 200, when the reliability of the radar angle is low, the position of the reflection point existing in the overlapped portion of the detection ranges is obtained without referring to the information on the angle detected by the radar (for example, see step S202 described above). Therefore, according to the radar device 200, even when the reliability of the radar angle is low, the position of the reflection point existing in the overlapped portion of the detection ranges can be appropriately obtained.

According to the radar device 200, when the relative velocity between the radars is deviated, the relative angle for determining the velocity vector is obtained can be corrected. Therefore, the velocity vector of the reflection point existing in the overlapped portion of the detection ranges can be appropriately obtained.

In the radar device 200, the surrounding environment recognition result by radar is collated with the map indicating the surroundings of the vehicle 1. It is often difficult for the in-vehicle camera to acquire a clear image around the subject vehicle, for example, when it is raining relatively heavily or when the amount of peripheral light is relatively small at night. On the other hand, even in such conditions, the radar device 200 can acquire the relatively good surrounding environment recognition result by using a radar. In other words, it allows the radar device 200 appropriately collates, by a radar having a relatively high environment resistance, the surrounding environment recognition result with the map indicating the surroundings of the vehicle 1. In addition, the radar device 200 can detect or correct the location of the vehicle 1 based on the collation result with the map.

Modified Examples

The radar device according to the embodiment described above may use the observation results by other sensors, such as the in-vehicle camera or LIDAR (light detection and ranging) to perform, for example, identification of the target, estimation of the position of the target (or the reflection point), and correction of the relative angle between the radars.

Various aspects of the disclosure derived from the embodiments described above and modified examples will be described below.

According to one aspect of the present disclosure provided is a radar device including: a first radar and a second radar that are arranged at positions separated from each other, and of which detection ranges are at least partially overlapped; and a detection unit configured to detect at least one of a moving direction and a velocity vector of a reflection point existing in an overlapped portion of the detection ranges, based on a first detection result of the first radar and a second detection result of the second radar.

In one aspect of the radar device, the detection unit is configured to detect at least one of a moving direction and a velocity vector of the reflection point by integrating, in a common coordinate space, first information on the reflection point obtained from the first detection result and second information on the reflection point obtained from the second detection result.

In another aspect of the radar device, the detection unit is configured to detect at least one of a moving direction and a velocity vector of the reflection point based on, a velocity of the reflection point obtained from the first detection result and an angle of the reflection point viewed from the first radar, and a velocity of the reflection point obtained from the second detection result and an angle of the reflection point viewed from the second radar.

In another aspect of the radar device, the detection unit is configured to detect a position of the reflection point, which is represented using a distance and an angle, based on information on distances obtained from each of the first detection result and the second detection result.

In another aspect of the radar device, the radar device further includes a correction unit configured to correct a relative angle between the first radar and the second radar, which is for determining the velocity vector is detected, based on the position of the reflection point. In the embodiment described above, the "correction unit 12" corresponds to an example of the "correction unit".

In another aspect of the radar device, the radar device further includes a collation unit configured to match a stationary target, specified based on at least one of the moving direction and the velocity vector of the reflection point, with map information. In the embodiment described above, the "collation unit 13" corresponds to an example of the "collation unit".

In another aspect of the radar device, the radar device further includes a ghost identification unit configured to identify a ghost based on the collation result between the stationary target and the map information. In the embodiment described above, the "identification unit 14" corresponds to an example of the "identification unit".

The present disclosure is not limited to the embodiments stated above, and can be appropriately changed without departing from the gist or idea of the present disclosure which will be appreciated from claims and the specification. The radar devices with such changes are also included in the technical scope of the present disclosure.

What is claimed is:

1. A radar device comprising:
   a first radar and a second radar that are arranged at positions separated from each other, and of which detection ranges are at least partially overlapped; and an electronic control unit configured to
- derive at least one of a moving direction and a velocity vector of a reflection point existing in an overlapped portion of the detection ranges, based on a first detection result of the first radar and a second detection result of the second radar, the first detection result and the second detection result including information on distances to the reflection point from the first radar and the second radar and information on angles of the reflection point viewed from the first radar and the second radar,
- when determining that a reliability of a radar angle of the radar device is low, derive a position of the reflection point that is represented using a distance and an angle, based on the first detection result and the second detection result without using the information on the angles obtained from the first detection result and the second detection result, and
- after deriving the position of the reflection point, correct a relative angle between the first radar and the second radar when determining that the relative angle deviates from an expected value, the relative angle being a value based on which the at least one of the moving direction and the velocity vector is derived.

2. The radar device according to claim 1, wherein the electronic control unit is configured to detect at least one of the moving direction and the velocity vector of the reflection point by integrating, in a common coordinate space, first information on the reflection point obtained from the first detection result and second information on the reflection point obtained from the second detection result.

3. The radar device according to claim 1, wherein the electronic control unit is configured to detect at least one of the moving direction and the velocity vector of the reflection point based on a velocity related to the reflection point obtained from the first detection result and an angle of the reflection point viewed from the first radar, and a velocity related to the reflection point obtained from the second detection result and an angle of the reflection point viewed from the second radar.

4. The radar device according to claim 1, wherein the electronic control unit is configured to derive the position of the reflection point by using trigonometry, based on the information on distances obtained from the first detection result and the second detection result.

5. The radar device according to claim 1, wherein
the electronic control unit is configured to collate a stationary target, specified based on the at least one of the moving direction and the velocity vector of the reflection point, with map information.

6. The radar device according to claim 5, wherein
the electronic control unit is configured to identify a ghost based on a result of collating the stationary target with the map information.

7. The radar device according to claim 1, wherein the electronic control unit is configured to determine that the reliability of the radar angle of the radar device is low when a degree of a deviation of a reflection point as a result of observing a reference element is larger than a predetermined threshold.

8. The radar device according to claim 1, wherein the electronic control unit is configured to correct the relative angle based on the position of the reflection point derived by using trigonometry, based on the information on distances obtained from the first detection result and the second detection result.

9. The radar device according to claim 1, wherein the electronic control unit is configured to correct the relative angle by referencing information on a result of observing a reference element, the information on the result of observing the reference element being stored in the radar device.

* * * * *